United States Patent [19]
Wartluft

[11] Patent Number: 5,366,260
[45] Date of Patent: Nov. 22, 1994

[54] PLASTIC PIPE COUPLER

[75] Inventor: Donald W. Wartluft, Broken Arrow, Okla.

[73] Assignee: Continental Industries, Inc., Tulsa, Okla.

[21] Appl. No.: 48,419

[22] Filed: Apr. 14, 1993

[51] Int. Cl.$^5$ ............................................. F16L 21/04
[52] U.S. Cl. ................................... 285/323; 285/339; 285/341; 285/371
[58] Field of Search ............... 285/339, 341, 371, 322, 285/323, 369, 382

[56] References Cited

U.S. PATENT DOCUMENTS

| | | | |
|---|---|---|---|
| 2,346,051 | 4/1944 | Seamaark | 285/339 |
| 3,393,926 | 7/1968 | Arnold | 285/322 X |
| 3,598,429 | 6/1971 | Arnold | 285/322 X |
| 3,692,336 | 9/1972 | Zon | 285/369 X |
| 3,713,675 | 1/1973 | White, Jr. | 285/322 X |
| 3,999,782 | 12/1976 | Shotbolt | 285/323 X |
| 4,068,866 | 1/1978 | Saha | 285/323 X |
| 4,107,452 | 8/1978 | Razvi | 174/84 |
| 4,138,144 | 2/1979 | Pierce, Jr. | 285/341 X |
| 4,213,641 | 7/1980 | Bennett | 285/369 |
| 4,229,025 | 10/1980 | Volgstadt et al. | 285/105 |
| 4,422,673 | 12/1983 | Blackford et al. | 285/322 X |
| 4,438,954 | 3/1984 | Hattori | 285/369 X |
| 4,445,714 | 5/1984 | Kisiel, III | 285/323 X |
| 4,712,813 | 12/1987 | Passerell et al. | 285/323 X |
| 5,027,459 | 5/1993 | Glover | 285/323 X |

*Primary Examiner*—Randolph A. Reese
*Assistant Examiner*—Heather Chun Shackelford
*Attorney, Agent, or Firm*—Head & Johnson

[57] ABSTRACT

The present invention is a unitary pipe coupler having an internally mounted hollow tube stiffener which extends through the coupler. The stiffener serves as a guide over which ends of the pipes slide as the pipes are inserted into the coupler and provides communication within the coupler between the two pipes. As the pipes are inserted into the coupler, each pipe passes consecutively through an opening provided in the coupler, an O-ring, a plurality of rigid backward oriented gripper serrations provided on a gripper, a plurality of backward oriented flexible sealing serrations provided on a front boot seal, until the end of each pipe rests against a flexible boot seal which abuts a hub for mounting the stiffener to the coupler. The gripper serrations prevent the pipes from being pulled or pushed outwardly away from the coupler.

9 Claims, 2 Drawing Sheets

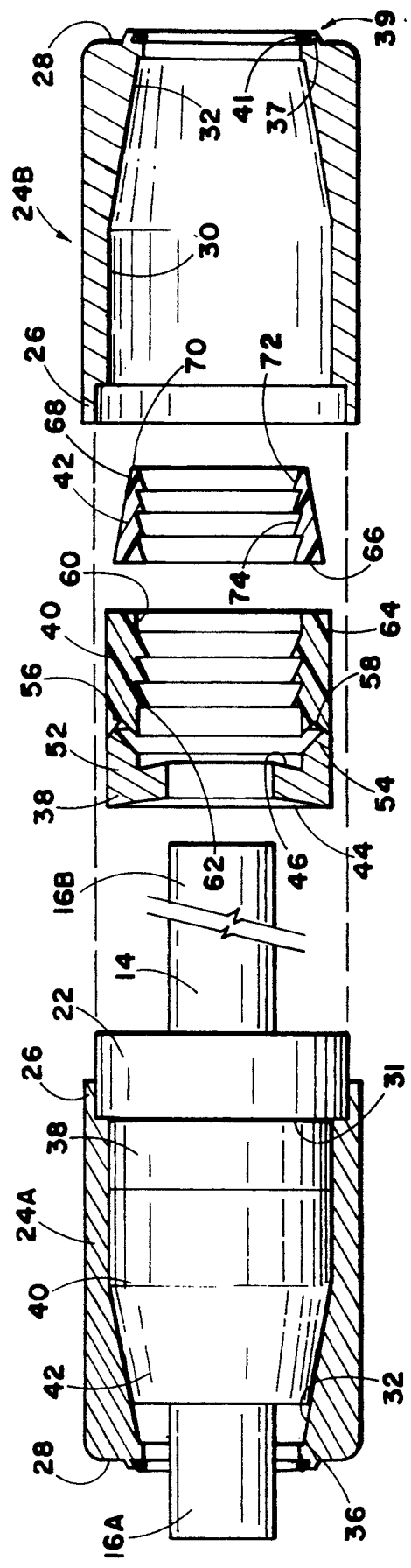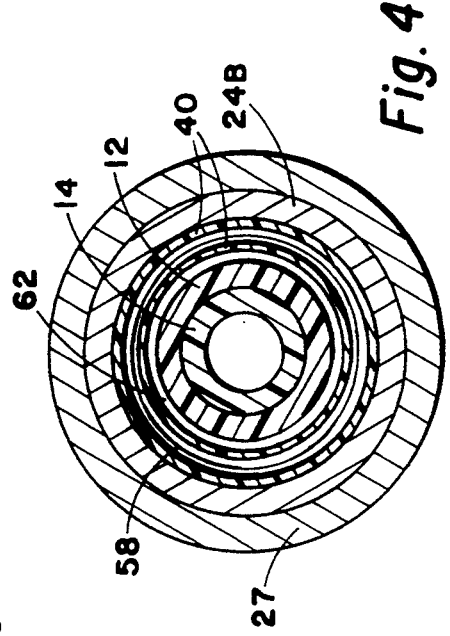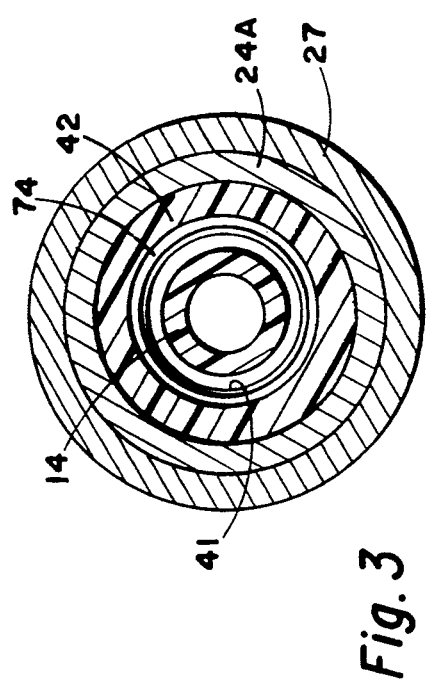

PLASTIC PIPE COUPLER

BACKGROUND OF THE INVENTION

1. Field Of The Invention

The present invention relates to a stab-type coupler designed to couple together plastic pipes. The pipes are slid into the coupler around opposite ends of a hollow tube stiffener provided in the coupler, and once inside the coupler, the pipes are held in fluidtight connection therewith by means of boot seals and grippers provided within the coupler.

2. Description of the Related Art

Stab-type couplers are designed to secure together pipes, usually plastic or other non-metallic types of pipes. Often these types of couplers are used at a construction site to fasten together pipes that are being installed underground. In such work environments, it is desirable to have a coupler that employs a minimum number of separate parts that can be dropped or lost. Also, it is desirable that the seal created between the coupler and the pipes be easy to form, for example, by a workman wearing gloves that limit his manual dexterity. In addition, the seal between the pipes and the coupler must be fluidtight, i.e. sealed against leakage of either liquids or gases, and must be secure enough so that the pipes will not become detached once they are coupled.

The present invention addresses these needs by providing a unitary coupler that seals to a pipe simply by sliding an end of the pipe into the coupler, thus forming a fluidtight seal between the pipe and the coupler. Also, the gripping means provided with the present invention is designed so that when external pulling force is exerted onto the pipe in order to remove the pipe from the coupler, the gripping means tightens against the exterior surface of the pipe, thus preventing the pipe from being pulled from the coupler. The tightening action of the gripping means around the pipe functions in a manner similar to the way toy "Chinese Handcuffs" tighten around a child's fingers as the child attempts to pull his fingers out of the Chinese handcuffs; the harder the child pulls, the tighter the Chinese handcuffs tighten around the fingers.

Also, the gripping means of the present invention is designed so that increasing pressure from within the tubes will also cause the gripping means to increasingly tighten around the exterior surface of the pipe, thus preventing the pipe from being blown out of the coupler.

SUMMARY OF THE INVENTION

The present invention is a new stab-type coupler employing a retained hollow tube stiffener which extends through opposite ends of the coupler. Two pipes which are to be joined together are slid over the tube stiffeners and pushed into the coupler so that the stiffener serves to provide communication between the pipes. A hub, encircling the stiffener approximately midway between the ends of the stiffener, secures the stiffener to the coupler. The hub is retained within the coupler between two reduced internal diameter inner ends which are provided on the two shell halves. The shell halves are held together by a protective outer body which forms an outer covering for the entire coupler.

Each of the hollow shell halves is provided internally with a straight portion which abuts the hub, a narrowing portion adjacent the straight portion, and a lip located between the narrowing portion and an outer end of the shell half, Each of the lips is provided with a groove into which an O-ring inserts as a means of restricting moisture and/or dirt from entering the coupler along with the pipes. The lips taper outwardly, and the slope of the taper continues in the outer body forming openings in the coupler through which the stiffener extends and through which the pipes are inserted into the coupler.

Internal to each of the straight portions and adjacent to the hub, the coupler is provided with a flexible rear boot seal. The rear boot seal has an inner side such that a gap is formed between the inner side and the hub at the stiffener. An outer side is provided on each of the rear boot seals parallel to the inner side in order to receive an end of the pipe when the pipe is pushed into the coupler. The inner side is provided peripherally with a longitudinally extended cylindrical portion having a reduced internal diameter slightly smaller than an external diameter of each of the pipes so that the pipes enter the cylindrical portion. The cylindrical portion terminates at a pointed lip.

A V-shaped notch provided on an inner end of a flexible boot seal movably engages the pointed lip. An interior surface of the front seal is provided with backwardly oriented serrations which flexibly engage the pipe as the pipe is pushed into the coupler and which provide a tight seal against an external surface of the pipe. An outer end on each of the front boot seals movably engages the rear face of a rigid gripper. Each of the grippers has a frusto-conical external surface corresponding to the narrowing portion of the shell half with which it mates, a front face opposite the rear face which abuts the lip and thereby retains the gripper within the coupler and, an interior surface provided with backwardly oriented serrations which bite into the pipe to hold the pipe within the coupler. As the pipes are inserted into the coupler, each pipe passes consecutively through the coupler's opening, the O-ring provided in the groove of the lip, the gripper, the front boot seal, until it finally abuts the outer side of the rear boot seal.

Once the pipe is inserted, the serrations on the gripper prevent the pipe from being either pushed or pulled outward away from the coupler. Attempts to withdraw the pipe causes the gripper to be wedged between the narrowing portion and the pipe, thus causing the backward oriented gripper serrations to bite more firmly into the pipe.

BRIEF DESCRIPTION OF THE DRAWINGS

FIG. 2 is a partially exploded and cut-away view of the plastic pipe coupler of FIG. 1 showing the outer body removed.

FIG. 3 is a cross-sectional view taken along line 3—3 of FIG. 1.

FIG. 4 is a cross-sectional view taken along line 4—4 of FIG. 1.

DETAILED DESCRIPTION OF THE PREFERRED EMBODIMENTS

Figure 1:
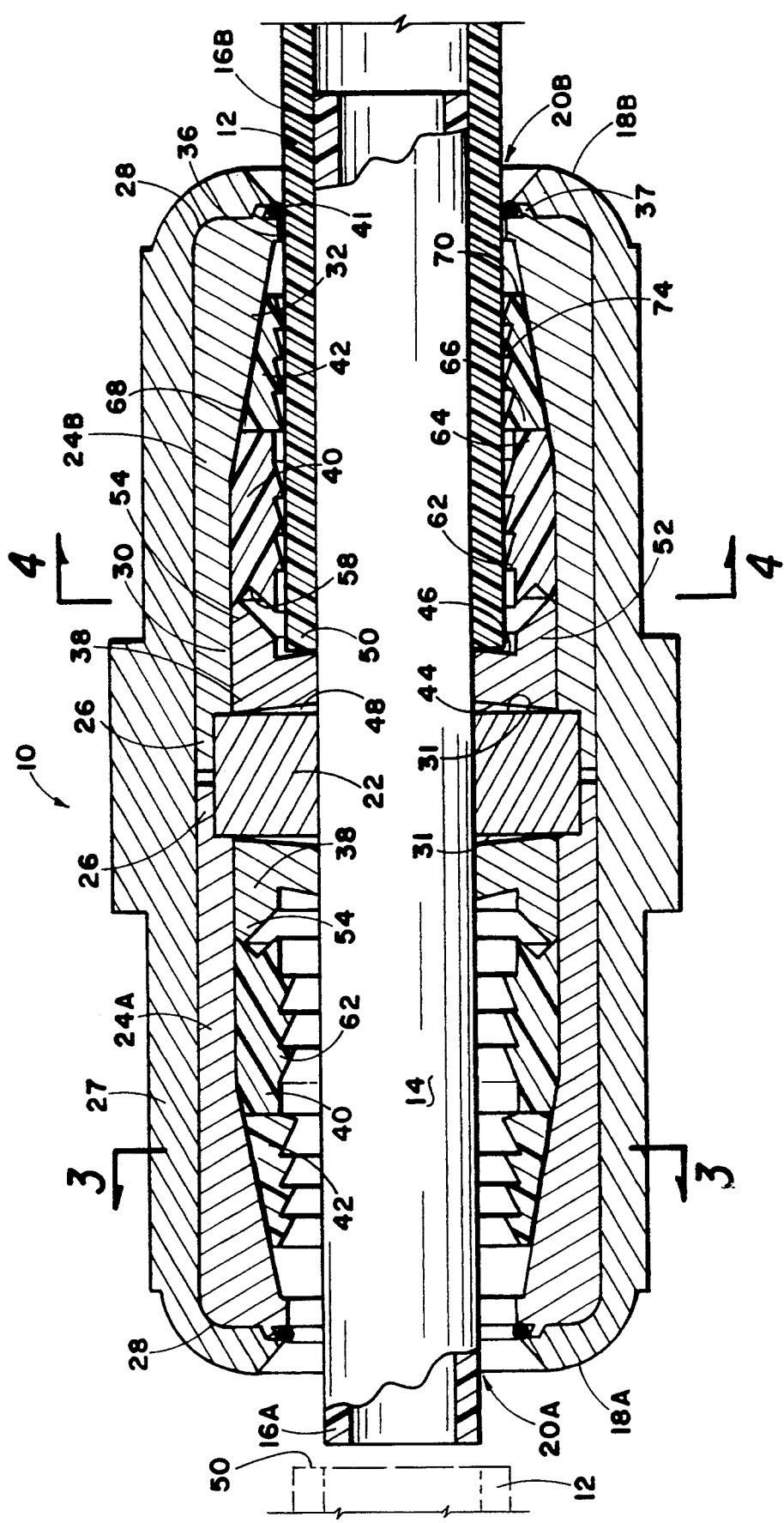
FIG. 1 is a cross-sectional front elevation of a plastic pipe coupler constructed according to a preferred embodiment of the present invention.

Referring now to the drawings and initially to FIGS. 1 and 3, there is illustrated a coupler 10 for use in securing together plastic pipes 12. The coupler 10 is provided with a straight hollow tube stiffener 14 that extends through the coupler 10. The stiffener is preferably constructed of rigid material, such as plastic or metal. The stiffener 14 has stiffener ends 16A and 16B that protrude respectively from ends 18A and 18B provided on the coupler 10.

As illustrated in FIGS. 1 and 4, the stiffener ends 16A and 16B each has an external diameter slightly smaller than an internal diameter of the pipes 12 in order to permit the pipes 12 to be slipped over the ends 16A and 16B and pushed along the stiffener 14. As the pipes 12 are pushed along the stiffener 14, they enter the coupler 10 via openings 20A and 20B provided respectively in the ends 18A and 18B, as will hereinafter be described more fully.

The stiffener 14 is secured within the coupler 10 by means of a hub 22 that encircles the stiffener 14 approximately midway between the stiffener ends 16A and 16B. The hub 22 is secured radially within the coupler 10 by means of two hollow inner shell halves 24A and 24B. Each of the shell halves 24A and 24B has an inner end 26 of enlarged internal diameter so that the inner ends 26 of shell halves 24A and 24B receive and secure the hub 22 between the shell halves 24A and 24B. A protective outer body 27 is provided external to the shell halves 24A and 24B and surrounding them. The protective outer body 27 serves to hold the shell halves 24A and 24B in position around the hub 22. The hub 22, the inner shell halves 24A and 24B, and the outer protective body 27 are all preferably constructed of rigid material, such as plastic.

Referring now to FIG. 2, each of the shell halves 24A and 24B has an outer end 28 opposite the inner ends 26. Adjacent the inner ends 26, each shell half 24A and 24B is hollow internally and is provided internally with a straight portion 30 having a uniform internal diameter. The hub 22 forms innermost vertical walls 31 for the straight portions 30. Adjacent to the straight portion 30 each shell half 24A and 24B is provided internally with a narrowing portion 32. Each of the narrowing portions 32 progressively decreases in internal diameter when moving outward from the straight portion 30 toward the outer ends 28 of the shell halves 24A and 24B. Adjacent each of the narrowing portions 32, the inner shell halves 24A and 24B are each provided with a reduced inner diameter straight segment 36 and with an inwardly oriented lip 37 located between the straight segment 36 and the outer end 28. As best seen in FIGS. 1 and 2, each of the lips 37 slopes slightly inward, forming a groove 39 adjacent the outer end 28 into which an O-ring 41 inserts. The purpose of the O-rings 41 is to engage the pipes 12 as they enter the coupler 10 and thereby reduce the moisture and dirt which may enter with the pipes 12 as they enter the coupler 10. The outer body 27 abuts each of the O-rings 41 in order to capture the O-rings 41 in the grooves 39 and retain them in the coupler 10. The outer body 27 is sloped away from the lip 37 to form the sloped openings 20A and 20B in the coupler 10.

Adjacent to the hub 22 and enclosed within each of the straight portions 30 of the shell halves 24A and 24B is a hollow rear boot seal 38; adjacent the rear boot seal 38 and enclosed within each of the straight portions 30 is a hollow front boot seal 40; and adjacent the front boot seal 40 and enclosed within each of the straight portions 30 and the narrowing portions 32 is a hollow gripper 42.

Both the rear boot seal 38 and the front boot seal 40 are preferably formed of a compressible material, such as rubber. As shown in FIGS. 1 and 2, the rear boot seal 38 is provided with an inner side 44 that abuts the hub 22 and is provided with an outer side 46 so that the outer side 46 is parallel with the inner side 44. The inner side 44 is sloped away from the hub 22 at the stiffener 14 so as to form a gap 48 between the inner side 44 and the hub 22 at the stiffener 14. As the pipes 12 are pushed into the coupler 10, an end 50 provided on each of the pipes 12 is pushed against the outer side 46, thus deforming the rear boot seal 38 into the gap 48.

A cylindrical portion 52 is provided peripherally on the outer side 46 of each of the rear boot seals 38. The cylindrical portions 52 have an internal diameter slighter larger than an internal diameter of the pipes 12, thus allowing the ends 50 of the pipes 12 to enter the cylindrical portions 52. The cylindrical portions 52 are provided with a longitudinally extending pointed lip 54.

An inner end 56 of the front boot seal 40 is provided with a V-shaped notch 58 that movably engages the pointed lip 54 of the rear boot seal 38. A hollow interior surface 60 is provided in the front boot seal 40. The interior surface 60 is provided with a plurality of sawtoothed-shaped flexible ridges or serrations 62 that flex to allow the pipe 12 to be inserted into the coupler 10. Once the pipe 12 has been inserted into the coupler 10, the serrations 62 flex back against the pipe 12, forming multiple ring seals along the pipe 12. The serrations 62 are backwardly oriented so that they are forced into a tighter sealing engagement with the pipe 12 when pulling force is exerted on the pipe 12. Also, when the pipe 12 experiences high pressure internally, pressure is exerted on the inner end 56 of the front boot seal 40 forcing the serrations 62 into tighter sealing engagement with the pipe 12.

The front boot seal 40 is provided with an outer end 64 located opposite the inner end 56. The outer end 64 movably engages a rear face 66 of the gripper 42 which functions to retain the boot seals 38 and 40 within the straight portion 30.

External surfaces 68 provided on each of the grippers 42 are generally frusto-conical so that the external surfaces 68 coincide in shape and slope with tile narrowing portions 32 of the inner shell halves 24A and 24B. The grippers 42 are preferably constructed of rigid material, such a plastic. A front face 70 is provided on each of the grippers 42 opposite each of the rear faces 66. The front faces 70 movably engage the straight segments 36 of the inner shells halves 24A and 24B. The straight segments 36 prevent the grippers 42 from reaching the outer ends 28 of the inner shell halves 24A and 24B, thus causing the grippers 42 to be captured within the coupler 10. The grippers 42 in turn hold the front and rear boot seals 40 and 38 within the straight portions 30 of the shell halves 24A and 24B.

Similar to the front boot seal 40, each of the grippers 42 is provided with a hollow interior surface 72 which is shown in FIG. 2. Similarly, the interior surface 72 is provided with a plurality of sawtooth-shaped ridges or gripper serrations 74. However, unlike the serrations 62 found on the front boot seal 40, the gripper serrations 74 are not flexible. Thus, when the pipes 12 are inserted into the coupler 10, the grippers 42 are pushed slightly inward, pushing the exterior surfaces 68 of the grippers 42 inwardly along the narrowing portions 32 of the inner shell halves 24A and 24B until the rear face 66 of each gripper 42 abuts the outer end 64 of its associated front boot seal 40. Engagement of the rear faces 66 with the outer end 64 of the front boot seal 40 prevents further inward movement of the grippers 42 within the coupler 10. Additional pushing force exerted on the pipes 12 causes the pipes 12 to slide pass the gripper serrations 74 so that the pipes 12 pass within the hollow grippers 42.

Once the pipes 12 have been fully inserted into the coupler 10, the pipes 12 are held in place by the backwardly oriented gripper serrations 74 which bite into the pipes 12. If a pulling force is thereafter exerted on the pipes 12, the grippers 42 adhere to the pipes 12 by means of the gripper serrations 74. The pulling force causes the grippers 42 to be pulled slightly outwardly, causing their exterior surfaces 68 to travel outwardly along the narrowing portions 32. This outward movement of the grippers 42 wedges the grippers 42 between the narrowing portions 32 and the pipes 12 and causing their gripper serrations 74 to more tightly bite into the pipes 12, thus preventing the pipes 12 from being withdrawn from the coupler 10.

While the invention has been described in terms of a straight connecting coupler 10, the invention includes other configurations employing one or more coupler openings 20A, 20B, etc. Such other configurations may include, by way of example and not limitation, tees, elbows, outlets on saddle tees and end caps (not illustrated).

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A coupler for securing a plastic pipe having uniform internal and external diameter and a planar end comprising:
    a hollow rigid coupler shell;
    a rigid tube stiffener secured internally of said shell by a hub member, said stiffener having ends at least one of which extends outwardly to adjacent an opening provided in said coupler shell, the stiffener having an external diameter less than said internal diameter of a pipe to be received by the coupling, the hub member being in the form of a short length tubular member having an internal diameter dimensioned to sideably receive said stiffener, the hub internal diameter being less than said external diameter of the pipe to be received by the coupling;
    said coupler shell opening communicating via a separate narrowing internal portion with a separate straight internal portion provided within said coupler shell, said hub member being positioned in the straight portion;
    a flexible hollow rear boot seal provided within said straight portion adjacent said hub means, the rear boot seal receiving said stiffener;
    a flexible hollow front boot seal being movably provided in said coupler shell straight portion contiguous with said rear boot seal, an interior surface of said front boot seal being provided with a plurality of serrations;
    a rigid hollow gripper having a frusto-conical external surface being in slidable engagement with said coupler shell narrowing internal portion, said gripper being movably retained within said coupler shell internal straight and narrowing portions, a plurality of gripper serrations being provided on an interior surface of said gripper, a rear face of said gripper movably engaging an outer end of said front boot seal; and
    gripper retaining means being provided on said coupler shell to prevent said gripper from exiting said coupler shell internal narrowing portion through said coupler opening, whereby a pipe can be positioned within said coupler shell to encompass a portion of said stiffener, said end of said pipe being adjacent said rear boot seal.

2. A coupler according to claim 1 wherein said rear boot seal is provided with an inner side which abuts said hub and an outer side parallel to the inner side which receives the end of the pipe, said outer side being peripherally provided with a cylindrical portion which terminates in a pointed lip.

3. A coupler according to claim 2 wherein said front boot seal is provided with a V-shaped notch on its interior surface which receives said pointed lip of said rear boot seal.

4. A coupler according to claim 1 wherein said serrations provided said front boot seal are backwardly oriented so that they flex in order to admit the pipe and once the pipe has been inserted into the coupler form a plurality of ring seals around the pipe.

5. A coupler according to claim 1 wherein said gripper serrations are backwardly oriented so that said gripper is forced inward as the pipe is inserted through said gripper and once the pipe is inserted said gripper serrations bite into the pipe to oppose the pipe's removal from the coupler.

6. A coupler according to claim 5 further comprising an inwardly oriented lip provided adjacent said straight segment of said coupler shell so as to form a groove, and an O-ring provided in said groove.

7. A coupler according to claim 6 wherein said O-ring is retained within said coupler by means of a protective outer body which encases the coupler except for said coupler opening.

8. A coupler according to claim 1 wherein said hub encircles said stiffener approximately halfway between opposed ends of said stiffener, said hub being secured within an outer increased internal diameter end portion of said coupler shell.

9. A coupler acording to claim 8 further comprising a protective outer body provided around said coupler shell.

* * * * *